(12) United States Patent
Brück

(10) Patent No.: US 6,276,595 B1
(45) Date of Patent: Aug. 21, 2001

(54) PROCESS AND GAS-PERMEABLE BRAZING FOIL FOR THE PRODUCTION OF A METALLIC HONEYCOMB BODY

(75) Inventor: Rolf Brück, Bergisch Gladbach (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 09/460,349

(22) Filed: Dec. 13, 1999

Related U.S. Application Data

(63) Continuation-in-part of application No. PCT/EP98/03455, filed on Jun. 9, 1998.

(30) Foreign Application Priority Data

Jun. 13, 1997 (DE) .............................................. 197 25 177

(51) Int. Cl.$^7$ .................................................. B23K 31/00
(52) U.S. Cl. .......................... 228/181; 228/184; 228/190; 502/439
(58) Field of Search ..................................... 228/181, 182, 228/183, 184, 190; 29/890; 422/180; 502/527.17, 439; 428/593

(56) References Cited

U.S. PATENT DOCUMENTS

| | | | |
|---|---|---|---|
| 3,783,969 | * | 1/1974 | Pall . |
| 3,960,509 | * | 6/1976 | Abriany . |
| 4,397,715 | | 8/1983 | Mohan et al. . |
| 4,650,618 | * | 3/1987 | Heinemann et al. . |
| 5,501,391 | * | 3/1996 | Wieres . |
| 5,617,992 | * | 4/1997 | Huddleston et al. . |
| 5,657,923 | * | 8/1997 | Sheller . |

FOREIGN PATENT DOCUMENTS

| | | |
|---|---|---|
| 2924592 | 5/1981 | (DE) . |
| 0552400A1 | 7/1993 | (EP) . |
| 0653264A1 | 5/1995 | (EP) . |
| WO 94/06594 | 3/1994 | (WO) . |

* cited by examiner

Primary Examiner—Tom Dunn
Assistant Examiner—Jonathan Johnson
(74) Attorney, Agent, or Firm—Herbert L. Lerner; Laurence A. Greenberg; Werner H. Stemer

(57) ABSTRACT

A process and a brazing foil are used for the production of a metallic honeycomb body which is wound, stacked or twisted from at least partially structured sheet layers. At least one end surface of the honeycomb body which is produced from the sheet layers is brought into contact with a gas-permeable brazing foil. The honeycomb body with the brazing foil is then subjected to a brazing procedure for metallically joining the sheet layers.

13 Claims, 2 Drawing Sheets

PROCESS AND GAS-PERMEABLE BRAZING FOIL FOR THE PRODUCTION OF A METALLIC HONEYCOMB BODY

CROSS-REFERENCE TO RELATED APPLICATION

This application is a continuation of copending International Application No. PCT/EP98/03455, filed Jun. 9, 1998, which designated the United States.

BACKGROUND OF THE INVENTION

Field of the Invention

The present invention relates to a process and a brazing foil for the production of a metallic honeycomb body which is wound, stacked or twisted from at least partially structured sheet layers.

Metallic honeycomb bodies are used, for example, as carrier bodies for catalytically active material for use in exhaust gas cleaning in connection with motor vehicles. Other uses in comparably fine sheet metal structures such as, for example, in heat exchangers are also possible.

The honeycomb body is subjected to a brazing operation to form a metallic connection of the sheet metal layers. German Published, Non-Prosecuted Patent Application DE 29 24 592 A1 discloses different possible ways of introducing brazing material into a metallic honeycomb body. The way in which the brazing material is introduced into a honeycomb body is dependent on the brazing material involved. If the material is brazing material in powder form, it can be introduced into the honeycomb body through the use of a brazing powder fluidized bed. In order to ensure that the brazing powder remains in the honeycomb body until a brazing procedure has been carried into effect, it is necessary for the honeycomb body to be at least partially coated with an adhesive so that the brazing powder can cling to the adhesive. Such a brazing procedure is also known from International Publication No. WO 94/06594.

It is also known from German Published, Non-Prosecuted Patent Application DE 29 24 592 A1 that the brazing material is introduced into the honeycomb body in the form of a brazing foil, in particular brazing strips. A brazing strip is introduced between the structured sheet metal layers during an operation of winding or stacking the sheet metal layers. When using a brazing strip it is possible to eliminate the use of an adhesive as is required when using a brazing powder. However, the step of introducing a brazing strip between the sheet metal layers results in losses in a pre-stressing force in the honeycomb body during the brazing procedure so that in part brazed joints are not formed between the sheet metal layers.

In accordance with German Published, Non-Prosecuted Patent Application DE 29 24 592 A1 a further possible way of introducing a brazing material into a honeycomb body provides for the at least partially structured sheet metal layers to be wound, stacked or twisted to form a cylindrical honeycomb body and then for a brazing foil of given thickness to be pressed into at least one end surface of the honeycomb body. In that operation the brazing foil is pressed into the honeycomb body to such an extent that the brazing material is intended to remain in the individual honeycombs during the brazing procedure.

A problem encountered with such a mode of operation is that the brazing foil may not be severed by the edges of the sheet metal layers since otherwise the brazed portions would fall out of the individual honeycombs of the honeycomb body upon thermal expansion of the honeycomb body in the radial direction. Brazing the honeycomb body in the region of the two end surfaces of the honeycomb body also involves problems since, during the operation of heating the honeycomb body with the brazing material to a brazing temperature, air which is to be found in the honeycomb body expands and that results in an increase in pressure within the honeycomb body. That increase in pressure can cause the brazing material to be urged out of the individual honeycombs.

SUMMARY OF THE INVENTION

It is accordingly an object of the invention to provide a process and a gas-permeable brazing foil for the production of a metallic honeycomb body, which overcome the hereinafore-mentioned disadvantages of the heretofore-known processes and devices of this general type, in which the production of the honeycomb body is simplified and in which a good brazed joint is achieved between sheet layers.

With the foregoing and other objects in view there is provided, in accordance with the invention, a process for the production of a metallic honeycomb body wound, stacked or twisted from at least partially structured sheet layers, which comprises placing at least one at least partially gas-permeable brazing foil at least at one end surface of the honeycomb body; bringing the at least one brazing foil into contact at least with at least one partial region of the sheet layers; and subjecting the honeycomb body to a brazing procedure for metallically joining at least the sheet layers.

The fact that the brazing foil is gas-permeable means that the gas in the honeycomb body has very little or no influence on the behavior of the brazing foil during the brazing procedure. That also provides that the brazing foil is sucked into the honeycomb body by virtue of a capillary action. It is therefore not absolutely necessary for the brazing foil to be pressed into the honeycomb body to that extent, for which purpose particular tools would be necessary, as is required from the state of the art.

The process according to the invention also permits the selective formation of metallic joints with at least the sheet layers of the honeycomb body. The sheet layers of the honeycomb body can be joined together in individual regions by virtue of a suitable configuration of the foil, so that it involves an external contour which does not necessarily correspond to the peripheral line of the end surface of the honeycomb body. This operating procedure also means that it is not necessary, as is known according to the state of the art in a brazing operation using powder, to employ masks through which an end surface of a honeycomb body is only selectively brazed. The selective or region-wise formation of metallic joints with the sheet layers can also be effected by a plurality of brazing foils being disposed at the end surface. The process according to the invention also permits a large number of variations in the possible configurations of metallic joints with at least the sheet layers of the honeycomb body.

Therefore, in accordance with another mode of the invention, at least one region of the sheet layers in each end surface of the honeycomb body can be brought into contact with at least one brazing foil.

In accordance with a further mode of the invention, a particularly mechanically stable honeycomb body is achieved if all sheet layers are brought into contact at least at one end surface with at least one brazing foil and subjected to a brazing procedure.

In accordance with an added mode of the invention, a preferred process is one in which at least one end surface of the honeycomb body which is produced from the sheet layers is at least partially brought into contact with a gas-permeable porous brazing foil. In particular, the brazing foil involves a brazing foam foil which has an open-pore, cell structure. A brazing foam foil of that kind has particularly good adhesion to the end surface of a honeycomb body. A further advantage of that operating procedure is also relatively good gas exchange between the ambient atmosphere and the honeycomb body through the brazing foam foil.

In accordance with an additional mode of the invention, in order to provide that the individual sheet layers of a honeycomb body are metallically joined to each other, the entire end surface of the honeycomb body is brought into contact with a brazing foil. Particularly good stability of a metallic honeycomb body is achieved by each end surface of the honeycomb body being brought into contact with a brazing foil and subjected to a brazing procedure. The fact that the brazing foil has a gas-permeable nature means that the sheet layers at each end surface of the honeycomb body can be brazed simultaneously, that is to say during a single brazing procedure.

In accordance with yet another mode of the invention, in order to provide improved adhesion of the brazing foil to an end surface of the honeycomb body it is proposed that the brazing foil be partially pressed into the honeycomb body. It is, however, pressed-in in such a way that gas-permeability of the brazing foil is substantially retained.

In accordance with yet a further mode of the invention, in order to simplify production of the metallic honeycomb body it is proposed that initially the brazing foil is applied to at least one end surface of the honeycomb body and thereafter the honeycomb body with the brazing foil is introduced into a tubular casing. Alternatively it is proposed that firstly the honeycomb body is introduced into a tubular casing and thereafter the brazing foil is applied to at least one end surface of the honeycomb body.

In accordance with yet an added mode of the invention, the honeycomb body with the brazing foil is subjected to a vacuum brazing procedure. A particularly good metallic joint with the sheet layers is achieved by virtue of the fact that the brazing foil is gas-permeable and the honeycomb body is subjected to a vacuum brazing procedure.

A preferred embodiment of the process is one in which a tubular casing with the honeycomb body and the sheet layers of the honeycomb body are joined together in a single brazing procedure.

Therefore, in accordance with yet an additional mode of the invention, the honeycomb body is disposed in a tubular casing and at least one brazing foil is brought into contact at least with a portion of an inner surface of the casing and with at least one region of the sheet layers. That also provides for a relatively rigid joint between the tubular casing and the honeycomb body.

In accordance with again another mode of the invention, if the elasticity of the honeycomb body is to be retained at least in one edge region which is adjacent the tubular casing, whereby different levels of thermal expansion in the radial direction of the honeycomb body and the tubular casing can be compensated for, the at least one brazing foil is disposed at a spacing from an inner surface of the tubular casing at the end surface of the honeycomb body.

In accordance with again a further mode of the invention, in order to provide for a further improvement in the metallic joint to the sheet layers, the honeycomb body with the brazing foil is firstly cleaned under a vacuum in a cleaning chamber and thereafter transferred into a process chamber for implementing the brazing procedure. The fact that the brazing foil adheres to at least one end surface of the honeycomb body means that there is no need to use adhesives or the like, as is known from processes which use brazing material in powder form. In the case of a thermal cleaning operation, in such processes the adhesive could become inactive so that the brazing material could drop out in further production steps. Contamination of the cleaning chamber due to vapors of the adhesive does not occur. If, for example, a protective gas atmosphere is introduced in the cleaning chamber after the production of a vacuum, then in the case of the process according to the invention the gas which serves to produce the protective gas atmosphere can be used a plurality of times since contamination of the gas by virtue of evaporation effects does not occur or occurs only to a very slight degree.

With the objects of the invention in view there is also provided a brazing foil for the production of a metallic honeycomb body wound, stacked or twisted from at least partially structured sheet layers, the brazing foil comprising a gas-permeable material.

The use of such a brazing foil for the production of a metallic honeycomb body means that it is possible to eliminate the relatively complicated and expensive step of applying brazing powder to the surface of the sheet layers. Honeycomb bodies which were coated with brazing powder were always open to the danger of the brazing powder becoming detached during an operation of transferring a honeycomb body into a brazing station. Such a danger no longer applies when using a brazing foil which is a macroscopic structure. That also simplifies the production of honeycomb bodies.

In accordance with another feature of the invention, the brazing foil is porous, in particular open-pored, so that the gas-permeability of the brazing foil is improved.

In accordance with a further feature of the invention, the brazing foil is a brazing foam foil.

In accordance with an added feature of the invention, in order to improve the brazing procedure and thus also a brazed joint between the parts to be joined together, in particular sheet layers, the brazing foil includes at least one fluxing agent.

In accordance with an additional feature of the invention, the brazing foil is a nickel-based material. The brazing foil may contain a small amount of carbon. It may also be substantially carbon-free.

In accordance with a concomitant feature of the invention, in order to reduce the brazing temperature and in order to improve the brazed joint, the brazing foil contains boron and/or silicon. The boron content of the brazing foil can be up to 8.5% by weight. The material of the brazing foil can also be substantially chromium-free.

Other features which are considered as characteristic for the invention are set forth in the appended claims.

Although the invention is illustrated and described herein as embodied in a process and a gas-permeable brazing foil for the production of a metallic honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
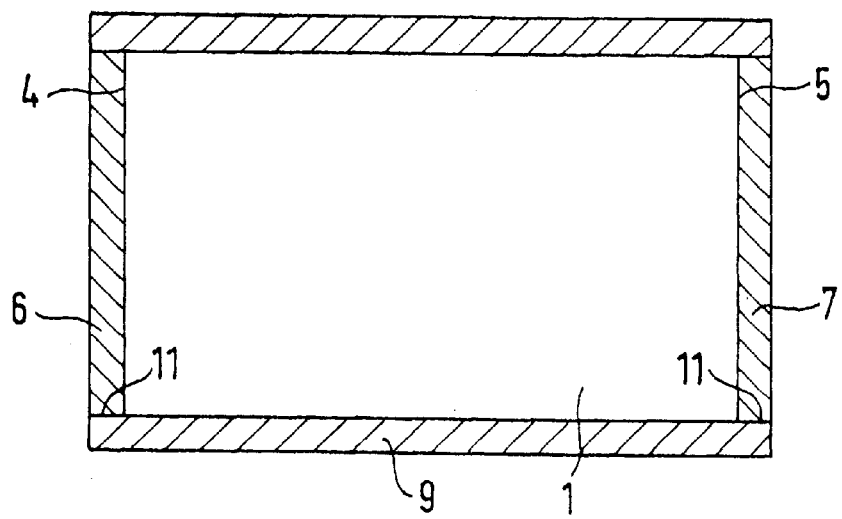
FIG. 1 is a diagrammatic, longitudinal-sectional view of a metallic honeycomb body.

Referring now to the figures of the drawings in detail and first, particularly, to FIG. 1 thereof, there is seen a longitudinal-sectional view of a honeycomb body. The honeycomb body 1 is disposed in a tubular casing 9 and has end surfaces 4, 5. A respective brazing foil or sheet 6, 7 is disposed at each end surface 4, 5. One of the brazing foils 6, 7 is pressed against each respective end surface 4, 5 so that it adheres to the honeycomb body 1. The brazing foils 6, 7 cover substantially the entire end surfaces 4, 5. The brazing foils 6, 7 bear against a portion of an inner surface 11 of the tubular casing 9.

Figure 2:
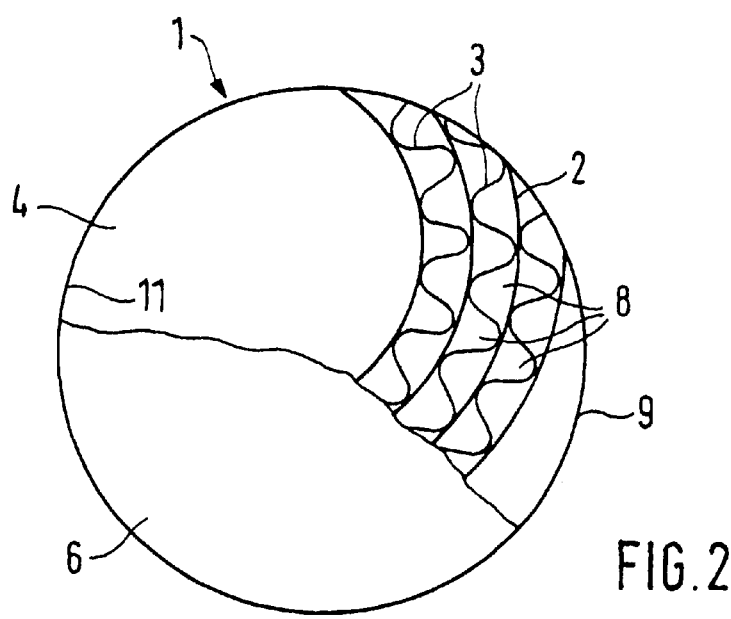
FIG. 2 is a partly broken-away, front-elevational view of the honeycomb body shown in FIG. 1.

As is shown in FIG. 2, the honeycomb body 1 is formed from smooth sheet metal layers 2 and structured sheet metal layers 3. The sheet layers 2, 3 define passages 8 which extend substantially in axial direction of the honeycomb body 4. Such honeycomb bodies 1 are used as catalyst carrier bodies in the exhaust system of a motor vehicle. FIG. 2 diagrammatically illustrates that the brazing foil 6 is disposed at the end surface 4. The external contours of the respective brazing foils 6 and 7 substantially correspond to the internal contour of the tubular casing 9 so that the entire end surfaces 4, 5 are covered with the brazing foil.

A honeycomb body which is prepared in this way is subjected to a brazing procedure. The fact that the brazing foil adheres to the respective end surface 4 or 5 means that the honeycomb body can be brazed in an upright position. In that configuration, the longitudinal axis of the honeycomb body extends substantially vertically. The brazing procedure can be effected in a vacuum brazing furnace since the brazing foil is gas-permeable. The individual passages 8 of the honeycomb body can also be evacuated by virtue of that nature of the brazing foil. A honeycomb body is advantageously subjected to a cleaning step in a cleaning chamber, prior to a vacuum brazing process. The cleaning step can be effected by the evacuation of a cleaning chamber. Thereafter, for example, a gas, in particular an inert gas, preferably a heated inert gas, can be introduced into the cleaning chamber. That removes possible residues, for example rolling oil, from the honeycomb body production procedure. Thereafter, the honeycomb body can possibly be subjected to a brazing procedure in a process chamber.

Figure 3:
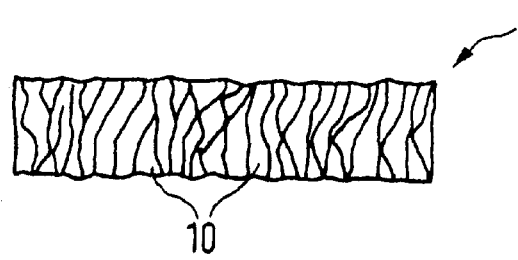
FIG. 3 is a cross-sectional view of a brazing foil.

The brazing foil 6, 7 is preferably in the form of a brazing foam foil or sheet, as is diagrammatically shown in FIG. 3. The brazing foam foil has through pores 10. The brazing foil is gas-permeable, by virtue of its pores or passages. The brazing foil preferably includes a fluxing agent and it is formed of a nickel-based material.

Figure 4:
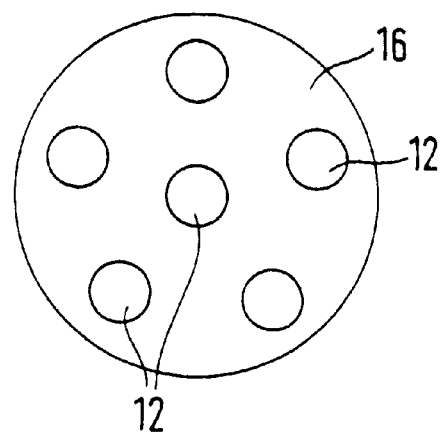
FIG. 4 is a plan view of a first embodiment of a brazing foil.

FIG. 4 shows a first embodiment of a brazing foil 16. The brazing foil 16 has through openings 12 through which regions of the sheet layers are not connected together. The shape and number of the through openings 12 can be adapted to a desired brazing result.

Figure 5:
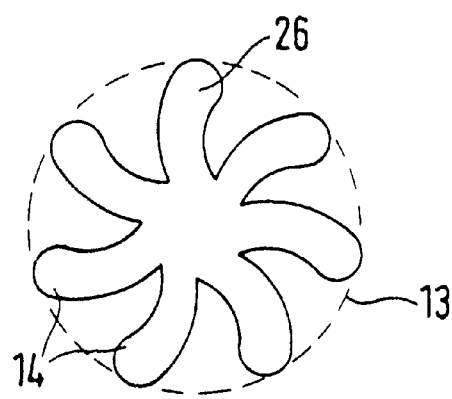
FIG. 5 is a plan view of a second embodiment of a brazing foil.

FIG. 5 shows a plan view of a second embodiment of a brazing foil 26. The brazing foil 26 has finger-like projections 14 extending from a center. End regions of the projections 14 lie on a common imaginary circumference 13. The circumference 13 can coincide with an outer periphery of an end surface of the honeycomb body. The configuration of the brazing foil 26 provides for a brazed joint with the sheet layers, which extends in a radiating relationship from a center of the honeycomb body.

Figure 6:
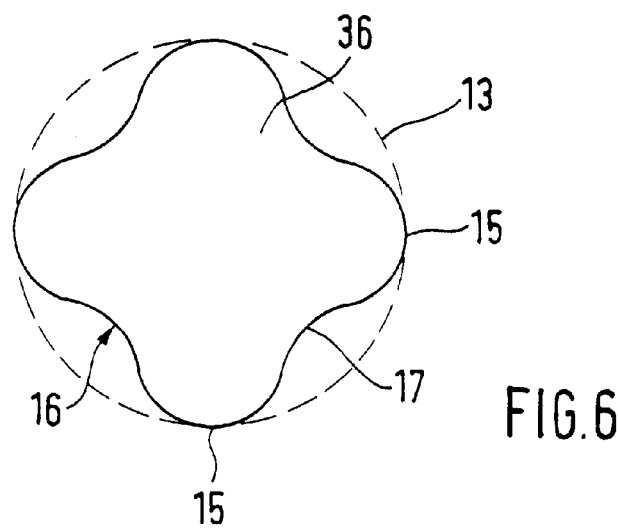
FIG. 6 is a plan view of a third embodiment of a brazing foil.

A third embodiment of a brazing foil 36 is shown in FIG. 6. An outer periphery of the brazing foil 36 has portions 15 which are disposed on a common imaginary circumference 13. A portion 17 which is located between adjacent portions 15 is disposed at a spacing relative to the circumference 13, as viewed from the center of the circumference 13 or the brazing foil 36. If the outer circumference 13 coincides with an inner periphery of an inner surface of the tubular casing, sheet layers are joined to the tubular casing, at the portions 15. The sheet layers of a honeycomb body are not joined to a tubular casing in the portions 17 between the portions 15.

I claim:

1. A process for producing a metallic honeycomb body, which comprises:

forming a honeycomb body by Performing an operation selected from the group consisting of winding, stacking, and twisting at least partially structured sheet layers and non-structured sheet layers together, placing at least one at least partially gas-permeable brazing foil at least at one end surface of the honeycomb body;

bringing the at least one brazing foil into contact at least with at least one partial region of the sheet layers; and subjecting the honeycomb body to a brazing procedure for metallically joining at least the sheet layers.

2. The process according to claim 1, which further comprises carrying out the bringing step by bringing at least one gas-permeable, porous brazing foil into contact at least with at least one partial region of the sheet layers.

3. The process according to claim 1, which further comprises carrying out the bringing step by bringing at least one brazing foam foil into contact at least with at least one partial region of the sheet layers.

4. The process according to claim 1, which further comprises carrying out the bringing step by bringing at least one partial region of the sheet layers in each end surface of the honeycomb body into contact with at least one brazing foil.

5. The process according to claim 1, which further comprises carrying out the bringing step by bringing all of the sheet layers in at least one end surface of the honeycomb body into contact with at least one brazing foil.

6. The process according to claim 1, which further comprises carrying out the bringing step by bringing at least one partial region of the sheet layers in at least one end surface of the honeycomb body into contact with a respective brazing foil.

7. The process according to claim 1, which further comprises at least partially pressing each brazing foil into the honeycomb body.

8. The process according to claim 1, which further comprises initially applying at least one brazing foil to at least one end surface of the honeycomb body, and then introducing the honeycomb body with the at least one brazing foil into a tubular casing.

9. The process according to claim 1, which further comprises initially introducing the honeycomb body into a tubular casing, and then applying at least one brazing foil to at least one end surface of the honeycomb body.

10. The process according to claim 1, which further comprises placing the honeycomb body in a tubular casing and bringing at least one brazing foil into contact at least with a portion of an inner surface of the tubular casing and with at least one partial region of the sheet layers.

11. The process according to claim 1, which further comprises placing the honeycomb body in a tubular casing, spacing at least one portion of at least one brazing foil away from an inner surface of the tubular casing, and bringing the at least one brazing foil into contact with at least one region of the sheet layers.

12. The process according to claim 1, which further comprises subjecting the honeycomb body with the brazing foil to a vacuum brazing procedure.

13. The process according to claim 1, which further comprises initially thermally cleaning the honeycomb body having the at least one brazing foil under vacuum in a cleaning chamber and then transferring the honeycomb body into a process chamber for carrying out the brazing procedure.

* * * * *